United States Patent [19]

Taylor

[11] 3,872,953
[45] Mar. 25, 1975

[54] HYDRAULIC BRAKE SYSTEM AND VALVE STRUCTURE

[75] Inventor: Ewing A. Taylor, Garland, Tex.

[73] Assignee: R. O. Evans, Garland, Tex.

[22] Filed: Mar. 19, 1971

[21] Appl. No.: 126,001

[52] U.S. Cl. ............... 188/353, 180/114, 192/3 H, 251/139, 303/89
[51] Int. Cl. ............................................. B60r 25/08
[58] Field of Search ....... 188/353; 303/89; 192/3 H; 180/114; 137/598; 251/139

[56] References Cited
UNITED STATES PATENTS

| | | | |
|---|---|---|---|
| 1,699,143 | 1/1929 | Hill | 251/139 X |
| 2,181,717 | 11/1939 | Wood et al. | 137/598 X |
| 2,296,132 | 9/1942 | Wiseley | 251/139 |
| 2,585,711 | 2/1952 | Whitney et al. | 188/353 X |
| 3,312,314 | 4/1967 | Peters | 188/353 |

*Primary Examiner*—George E. A. Halvosa
*Attorney, Agent, or Firm*—Clegg, Cantrell & Crisman

[57] ABSTRACT

Disclosed is a hydraulic brake system utilizing a valve operative to lock hydraulic brake fluid in the wheel cylinders. The valve includes a cylindrical body with a horizontal bore passing therethrough and surrounded by an electrically energized coil. A magnetic ball is disposed in an enlarged chamber intermediate the magnetic core and the outlet from the valve and is operative to act as a check valve to limit fluid flow in one direction when the coil is energized. Also disclosed is a circuit for activating the valve which is adapted to operate in conjunction with the brake light switch and ignition switch of a motor vehicle.

8 Claims, 3 Drawing Figures

3,872,953

EWING A. TAYLOR
*INVENTOR*

*ATTORNEY*

3,872,953

HYDRAULIC BRAKE SYSTEM AND VALVE STRUCTURE

This invention relates to hydraulic brake systems. More particularly, it relates to a magnetically operated brake locking system for automatically locking hydraulic fluid under pressure in an automotive hydraulic brake system to provide a locked parking brake or the like.

Most conventional automobiles utilize hydraulic braking systems wherein hydraulic fluid from a master cylinder is forced through distribution lines to individual brake cylinders located at each wheel. In a conventional system pressure is applied to the brake cylinders only be maintaining pressure on the master cylinder. When pressure on the master cylinder is released, the pressure on the brake cylinders is automatically released. No means is provided to lock the system and maintain pressure in the brake cylinders without applying pressure to the brake pedal which activates the master cylinder.

Conventionally a parking brake is provided which is separate from the hydraulic braking system. The parking brake is usually a mechanical device which may be locked in position. Ordinarily the parking brake is separate from the hydraulic braking system and thus may function also as an emergency brake. The parking brake, however, functions as an emergency brake and thus only operates to lock the rear wheels of the vehicle by either locking each wheel individually or the drive train.

Since the conventional parking brake only affects the rear wheels of the vehicle, the vehicle may be readily towed even with the parking brake activated by merely lifting the rear wheels. Furthermore, since the parking brake only affects the rear wheels, deactivation of the parking brake prior to starting the automobile is frequently overlooked, resulting in damage to the parking and emergency brake apparatus.

In accordance with the present invention a system is provided whereby hydraulic fluid may be locked in the conventional hydraulic brake system under pressure to maintain the brakes in a locked position after pressure on the master cylinder has been released. The brakes on either the front or the rear wheels or all four wheels may be locked while the car is parked. A particular feature of the invention is an automatic locking valve which locks any fluid in the brake cylinders at any time the ignition system is turned off and releases the fluid whenever the ignition key is on. The locking mechanism requires no external source of power, yet is effective to maintain the hydraulic system under pressure until released by the ignition switch. Furthermore, with the ignition switch off, the pressure on the brake cylinders cannot be accidentally released. Other features and advantages of the invention will become more readily understood when taken in connection with the appended claims and attached drawings in which:

Figure 1:
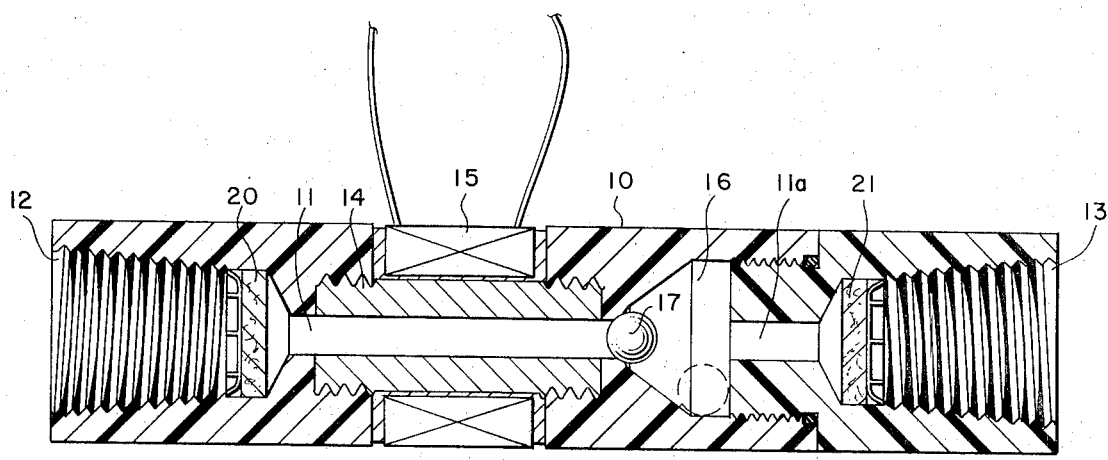
FIG. 1 is a sectional view of the preferred embodiment of the locking valve of the invention.

The preferred embodiment of the valve of the invention is illustrated in FIG. 1. The valve includes a cylindrical body of a nonmagnetic material having a longitudinal bore 11 passing therethrough. Bore 11 communicates with inlet and outlet ports 12 and 13, respectively. Since the valve is particularly adapted to be inserted in the hydraulic fluid line between the master cylinder and the wheel cylinders and hydraulic fluid may pass in either direction therethrough, the inlet is designated by the numeral 12 merely to identify the end of the valve which is to be oriented toward the master cylinder. Likewise, outlet 13 identifies the end of the valve which is oriented toward the wheel cylinders.

A cylindrical core of magnetic material 14, such as soft iron or the like, is disposed longitudinally within the body 10 surrounding at least a portion of the bore 11. An electrical coil 15 surround at least a portion of the core 14 to form an electromagnet operative only when current is passed through coil 15.

An enlarged chamber 16 is formed within body 10 and disposed between the magnet core 14 and outlet 13. Chamber 16 is preferably conical with its apex terminating at the bore opening in magnet core 14. Fluid communication between chamber 16 and outlet 13 is provided by means of bore 11a which is substantially centrally disposed in the base of the conical chamber and coaxially aligned with the bore 11.

A ball 17 of magnetic material is disposed within chamber 16. Ball 17 is adapted to mate with the opening in the end of bore 11 in a sealing relationship when in the position illustrated in FIG. 1, thus blocking the flow of fluid from outlet 13 through chamber 16 and into bore 11. It will thus be observed that when ball 17 is seated in the bore 11 as illustrated in FIG. 1, the valve acts as a one-way valve preventing the flow of fluid from chamber 16 into bore 11 while allowing fluid to flow from inlet 12 through bore 11 and into chamber 16. However, since chamber 16 has inclined walls, ball 17 will ordinarily rest in the position shown in phantom in FIG. 1, thus allowing the flow of fluid in either direction through valve 10. The valve, therefore, becomes operative only when ball 17 is seated in the bore 11 either by magnetic attraction or by pressure differences between chamber 16 and bore 11 as will be more fully explained hereinafter.

In preferred embodiment of the invention filter means 20 and 21 are disposed between inlets 12 and 13 and the bore 11, respectively, to prevent magnetic material and the like from entering the valve bore. Filter means 20 and 21 may be simply fine mesh brass seives or other such filters well known in the art.

Figure 2:
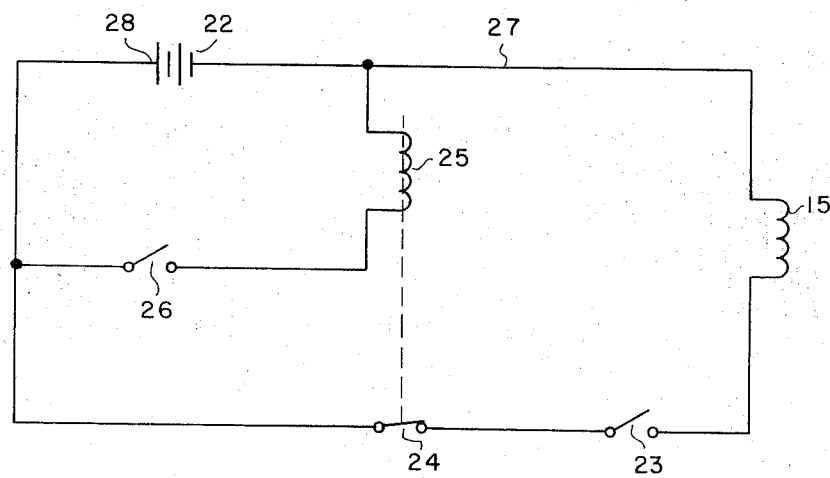
FIG. 2 is a schematic illustration of a brake system employing one embodiment of the invention.
Figure 3:
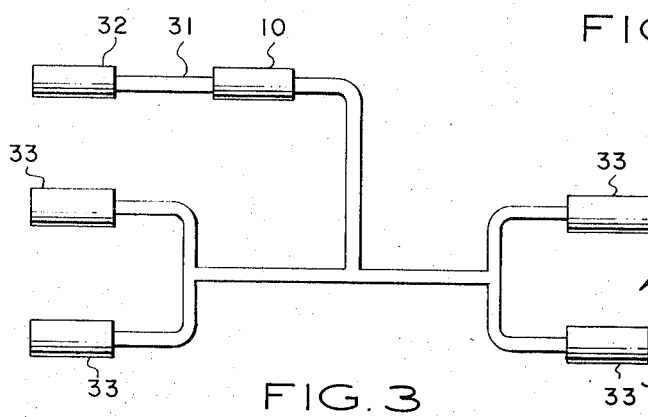
FIG. 3 is a schematic illustration of the circuit employed to activate the locking valve.

The described valve may be installed in any conventional wheeled vehicle which employs hydraulic brakes. The valve 10 can be installed in the conduit 31 between the foot operated master cylinder 32 and the slave cylinders 33 as shown in FIG. 2. The slave cylinders 33 are generally located at or near the wheels and are operative to activate braking devices, such as drum or disc brakes. Valve 10 will be operative for all four wheel cylinders when connected as shown. It will be understood, however, that the valve 10 may be installed only in conduits leading to either front or rear wheel cylinders as desired. The brake cylinders controlled by the valve will merely be determined by the conduit in which it is inserted.

In use, inlet 12 is disposed toward the master cylinder and outlet 13 disposed toward the wheel cylinders. It will be observed that when no current is applied to the electrical coil 15 surrounding magnet core 14 the check valve ball 17 will rest at the base of the conical chamber 16. Accordingly, fluid may flow bilaterally through the valve 10. Preferably, the valve is placed in an inclined position with outlet 13 lower than inlet 12 so that even if the car is inclined it will have no effect whatsoever on the operation of the conventional hydraulic brake system as long as magnet core 14 is not energized. However, when current is passed through coil 15, energizing core 14, magnetic ball 17 will be attracted toward the opening in bore 11 passing through core 14.

As long as core 14 is energized, ball 17 will remain in the position indicated in FIG. 1. In this position fluid may be forced through valve 10 from the inlet 12 through the outlet 13 and the valve will have little effect thereon. However, since ball 17 is positioned to block the bore 11, fluid cannot pass in the reverse direction, i.e., from outlet 13 toward inlet 12. Therefore, if the coil 15 is energized and the ball 17 moved to the position illustrated, application of pressure on the foot pedal to activate the master cylinder will force fluid through the valve 10 and into the wheel cylinders. Since the fluid is blocked from returning through bore 11 by ball 17, the brakes on the vehicle will remain locked. Since the valve 17 acts as a one-way check valve the brake fluid cannot escape and the brakes will remain locked so long as current is applied to the coil 15. Furthermore, if pressure on the fluid in the master cylinder is released, the fluid pressure in chamber 16 will be greater than the fluid pressure on bore 11. Ball 17 will therefore remain in a position to block bore 11 without the assistance of the magnetic field of coil 15 and the wheel cylinders will remain locked even when current is no longer applied to the coil 15. Thus the wheels will remain locked until such times as sufficient pressure is applied to the fluid in bore 11 to dislodge ball 17 from the bore, allowing the ball to roll down the inclined wall of chamber 16. The brake system will then function normally.

The preferred circuit for activation of the locking valve of the invention is illustrated in FIG. 2. Coil 15 is interconnected to one terminal of a conventional automobile storage battery 22 by common or ground lead 27. The other side of coil 15 is connected to the hot terminal 28 of the battery 22 through the brake light switch 23 and a normally closed switch 24. It will be appreciated that switch 23 is the conventional brake light switch of an automobile which is closed to cause illumination of the brake lights whenever the brake pedal is activated. Accordingly, it will be appreciated that coil 15 is connected in parallel with the brake lights of the automobile and thus will be activated by closing of switch 23 whenever the brake pedal is depressed. Relay 25 is connected in parallel with coil 15 across the ignition switch represented by 26. Relay 25, when energized, opens normally closed switch 24 thus opening the circuit through coil 15.

It will thus be appreciated that when the ignition switch 26 is open normally closed switch 24 remains closed. Therefore when pressure is applied to the brake pedal brake light switch 23 will be closed and coil 15 will be energized. When coil 15 is energized core 14 will become magnetic and attract magnetic ball 17 to the position illustrated in FIG. 1. It will thus be appreciated that as hydraulic fluid is forced under pressure through bore 11 into chamber 16, ball 17 will remain near the opening in bore 11 and prevent the flow of brake fluid in the reverse direction. Any fluid forced into the wheel cylinders will thus remain locked in the wheel cylinders as long as the switch 23 remains closed. It will further be appreciated that upon release of pressure on the brake pedal switch 23 will open and current will open and current will not longer flow through coil 15. However, due to the pressure differential between chamber 16 and bore 11, brake fluid in the wheel cylinders will force ball 17 to seat in the opening of bore 11. Therefore, the brake fluid in the cylinder will remain trapped in the wheel cylinders under pressure, locking the brakes. It will also be observed that even though current is no longer flowing through coil 15 application of pressure accidentally to the fluid in bore 11, such as by accidentally stepping on the brake pedal while the ignition switch 26 is open, will cause closing of switch 23 to again activate coil 15 so that the ball 17 will remain in the vicinity of the bore and again block return passage of any fluid through the bore when the pressure is released on the brake pedal and switch 23 opened.

It will also be observed that when ignition switch 26 is closed, relay 25 will be activated to open normally closed switch 24. Fluid will remain trapped in the brake system by ball 17, however, until sufficient pressure is applied on the master cylinder to dislodge the ball. Although switch 23 will be closed, switch 24 will be open and coil 15 cannot be energized. Accordingly, ball 17 will roll to the bottom of chamber 16 leaving the brake system to function normally until ignition switch 26 is again opened. Since the coil 15 cannot be energized at any time the ignition switch is closed regardless of the position of the brake light switch 23, the ball 17 will remain in the lower position regardless of the pressure applied to the brakes while the ignition switch is closed. However any time the ignition is opened and brake light switch 23 closed, the coil 15 will be activated and lock the fluid in the wheel cylinders.

Utilizing the control circuit described with reference to FIG. 2, it will be appreciated that the control valve cannot be accidentally engaged while the ignition switch is closed, thus there can be no danger that the brakes will become locked unless desired. However, when the ignition switch is open, the fluid in the wheel cylinders will be trapped and the pressure on the wheel cylinders cannot be accidentally released without closing the ignition switch.

It will this be observed that the invention provides automatic means for locking the hydraulic brakes on a vehicle whenever the ignition switch is open and the brake pedal depressed. Furthermore, the locking system cannot be accidentally activated if the ignition switch is closed and cannot be accidentally released when the ignition switch is opened.

It is to be understood that although the invention has been described with particular reference to specific embodiments thereof, the form of the invention as shown and described is to taken as a preferred embodiment of same, and that various changes and modifications may be resorted to without departing from the spirit and scope of the invention as defined by the appended claims.

What is claimed is:

1. In a brake system for a wheeled vehicle, including an ignition system having an ignition switch operable to on and off positions, a hydraulic master cylinder, operable by a brake means, a plurality of slave cylinders operable to actuate braking devices at wheels of said vehicle and a fluid conduit connecting the master cylinder to operate at least one slave cylinder, the improvement comprising:
  a. selectively enabled check valve means having a first bore having one end connected by the fluid conduit to the master cylinder, an enlarged chamber at the other end of said bore, a bore opening through which said first bore communicates with said chamber, a free rolling ball disposed within said chamber, said ball being larger than the diameter of said bore opening but substantially smaller than said chamber, and a second bore providing fluid communication between the chamber and fluid conduit connecting the second bore to said at least one slave cylinder, said valve means permitting fluid flow through said bore in only a first direction from the master cylinder to the slave cylinder when enabled to attract said ball to lodge in the bore opening and thereby prevent fluid flow in a second direction from the chamber to the first bore while permitting fluid flow from the bore to the chamber, said valve means permitting fluid flow through said bore in either of said two directions when not enabled and when said ball is not lodged in the bore opening;
  b. enabling means, coupled with the ignition switch, for enabling said valve means upon operation of the brake means when the ignition switch is off; and
  c. disabling means, coupled with the ignition switch, for disabling said valve means when the ignition switch is on;
  d. said ball being drawn toward said bore opening when said enabling means enables said valve and remaining lodged in the bore opening by back pressure from the slave cylinder and preventing fluid flow from the chamber toward the master cylinder until said brake means is operated with the ignition switch on causing said master cylinder to exert fluid pressure against the ball sufficient to dislodge the ball from the bore opening and permit fluid flow in either direction in the bore.

2. A brake system as deined in claim 1 wherein the check valve means includes:
  a. a body of non-magnetic material having inlet and outlet means, said bore and chamber passing through said body with said bore communicating with said inlet means and said chamber communicating with said outlet means;
  b. an electrically energized coil wound in a magnetic core substantially surrounding a portion of said bore;
wherein said ball is composed of magnetic material and wherein the enabling means comprises means for energizing said coil.

3. A brake system as defined in claim 2 wherein the valve means is mounted with its outlet end lower than its inlet end.

4. A brake system as defined in claim 2 wherein said enabling means comprises a voltage source, normally closed switch and a normally open switch connected in series with said coil, means coupling said series connection of said switches and said coil to said voltage source, said normally open switch operable to close when said master cylinder is operated.

5. A brake system as defined in claim 4 wherein said disabling means comprises circuit means coupled to said voltage source, said circuit means including said ignition switch and a relay operable to open said normally closed switch when said ignition switch is on.

6. In a hydraulic brake system of a vehicle which includes an ignition switch and a brake peddle, the improvement comprising:
  a valve for controlling the passage of fluid therethrough including (a) a body of non-magnetic material having inlet and outlet means, (b) a bore passing through said body and communicating with said inlet and outlet means, (c) said body having an enlarged chamber intermediate a portion of said bore and said outlet means, (d) a magnetic ball disposed within said chamber, said ball being of sufficient size to obstruct said portion of the bore, and (e) an electrically energizable magnetic core substantially surrounding said portion of the bore for attracting said magnetic ball to seat in said portion of the bore when energized, to thereby obstruct the passage of fluid from the chamber to said portion of the bore while allowing passage of fluid from said portion of the bore to said chamber, said valve being operable to maintain the ball seated in said portion of the bore when said core is unenergized until said brake peddle is depressed to increase the fluid pressure in said portion of the bore and thereby force the ball from said portion, and
  a control circuit including (f) first circuit means responsive to the depression of said brake peddle for energizing said core, and (g) second circuit means responsive to the operation of said ignition switch for preventing energization of said core.

7. A brake system as in claim 6 wherein said enlarged chamber is substantially conical, the apex thereof terminating in said portion of the bore, and the base thereof having a bore passing longitudinally therethrough and communicating with said outlet means.

8. A brake system as in claim 6 wherein said valve includes filter means disposed within said inlet and said outlet means.

* * * * *